United States Patent
An et al.

(10) Patent No.: US 11,372,439 B2
(45) Date of Patent: Jun. 28, 2022

(54) PEDAL APPARATUS FOR VEHICLE

(71) Applicant: SL Corporation, Daegu (KR)

(72) Inventors: Changwen An, Gyeongsan-si (KR); Taejo Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/409,174

(22) Filed: Aug. 23, 2021

(65) Prior Publication Data
US 2022/0100222 A1    Mar. 31, 2022

(30) Foreign Application Priority Data

Sep. 29, 2020 (KR) ........................ 10-2020-0127577

(51) Int. Cl.
| | | |
|---|---|---|
| *G05G 1/38* | (2008.04) | |
| *B60K 26/02* | (2006.01) | |
| *G01D 5/14* | (2006.01) | |
| *G05G 1/44* | (2008.04) | |

(52) U.S. Cl.
CPC ............... *G05G 1/38* (2013.01); *B60K 26/02* (2013.01); *G01D 5/14* (2013.01); *G05G 1/44* (2013.01)

(58) Field of Classification Search
None
See application file for complete search history.

(56) References Cited

U.S. PATENT DOCUMENTS

| | | | | |
|---|---|---|---|---|
| 6,972,558 B1 * | 12/2005 | Robinson | ................ | G01F 23/38 324/207.2 |
| 7,795,708 B2 * | 9/2010 | Katti | ..................... | H01L 23/552 257/679 |
| 10,296,037 B2 * | 5/2019 | Henrikson | ............... | G05G 1/38 |

FOREIGN PATENT DOCUMENTS

| | | |
|---|---|---|
| KR | 10-0762982 B1 | 10/2007 |
| KR | 10-2002-0036376 A | 5/2022 |

* cited by examiner

*Primary Examiner* — Vicky A Johnson
(74) *Attorney, Agent, or Firm* — United One Law Group LLC; Kongsik Kim; Jhongwoo Peck

(57) ABSTRACT

A pedal apparatus for a vehicle includes a rotary arm provided in a pedal housing and configured to rotate with respect to a rotational axis by an operating force applied to a pedal pad; a magnet whose position is changed as the rotary arm rotates; a position detector configured for detecting a position of the rotary arm as the rotary arm rotates. The position detector includes: a sensor configured for sensing a strength of a magnetic field generated by the magnet; and a plurality of shield portions arranged to have different distances from the magnet, shielding the magnetic field generated by each of the magnet from an external magnetic field source.

13 Claims, 16 Drawing Sheets

PEDAL APPARATUS FOR VEHICLE

CROSS-REFERENCE TO RELATED APPLICATION

This application claims priority to Korean Patent Application No. 10-2020-0127577 filed on Sep. 29, 2020. The aforementioned application is herein incorporated by reference in its entirety.

BACKGROUND

1. Technical Field

The present disclosure relates to a pedal apparatus for a vehicle, and more particularly, to a pedal apparatus for a vehicle capable of preventing inaccurate detection of a pedal position due to external interference.

2. Description of the Related Art

Generally, an accelerator pedal provided in a vehicle for accelerating the vehicle by adjusting the amount of air aspirated into an engine and/or the amount of fuel injected into the engine depending on an angle to which the pedal is rotated due to a driver's stepping force.

Depending on the installation structures, the accelerator pedal is categorized into a pendant type that is installed by being hung on a dash panel and an organ type that is installed on a floor panel. Further, depending on the operating principles, the accelerator pedal is categorized into a mechanical type and an electronic type.

The accelerator pedal is rotated, and its position is varied, when a driver steps on the pedal and when the driver takes the foot off the pedal. Its position is detected in accordance with the strength of a magnetic field generated by a magnet provided in the accelerator pedal.

However, when an external magnetic field exits, which affects the magnetic field of the magnet provided in the accelerator pedal, the detected magnetic field is affected, whereby the position of the accelerator pedal is detected inaccurately.

Therefore, a method for preventing inaccurate detection of a position of an accelerator pedal, by preventing a magnetic field generated by a magnet from being affected by an external magnetic field has been required.

SUMMARY

The present disclosure has been devised to solve the above problems, and an object of the present disclosure is to provide a pedal apparatus for a vehicle, in which mutual interference is prevented between a magnetic field of a magnet and an external magnetic field by including shield portions that respectively shield the magnetic field of the magnet from the external magnetic field.

Another object of the present disclosure is to provide a pedal apparatus for a vehicle, in which an air gap is formed between the shield portions, which respectively shield a magnetic field due to the magnet and the external magnetic field, to reduce a space occupied by the shield portions.

The objects of the present disclosure are not limited to those mentioned above, and additional objects of the present disclosure, which are not mentioned herein, will be clearly understood by those skilled in the art from the following description of the present disclosure.

According to an aspect of the present disclosure, a pedal apparatus for a vehicle may include a rotary arm provided in a pedal housing and configured to be rotated with respect to a rotational axis by an operating force applied to a pedal pad that is connected at a distal end of the rotary arm; a magnet, a position of which is changed as the rotary arm rotates; a position detector configured for detecting a change of the position of the magnet as the rotary arm rotates. Further, the position detector may include a sensor configured for sensing a strength of a magnetic field generated by the magnet; and a plurality of shield portions arranged to have different distances from the magnet to shield the magnetic field generated by the magnet from a magnetic field generated by an external magnetic field source.

An air gap may be formed between the plurality of shield portions. A width of the air gap may be determined depending on a thickness of each of the plurality of shield portions. By way of example, the greater the thickness of each of the plurality of shield portions is, the smaller the air gap may be.

Alternatively or additionally, adjacent shield portions among the plurality of shield portions may be disposed to be spaced apart from one another at a predetermined distance, and a member having a thickness corresponding to the predetermined distance and made of a non-conductive material may be disposed between the adjacent shield portions. The plurality of shield portions may be disposed in an opposite direction of the magnet with respect to the sensor.

The plurality of shield portions may include a first shield portion arranged at a first distance from the magnet, and a second shield portion arranged at a second distance from the magnet, the second distance being greater than the first distance. At least one of magnetic force lines emitted from the magnet may be formed to be converged on the magnet via the first shield portion, and at least one of magnetic force lines emitted from the external magnetic field source may be formed to be converged on the external magnetic field source via the second shield portion. The first shield portion may shield the magnetic force line emitted from the magnet from being formed toward the second shield portion, and the second shield portion may shield the magnetic force line emitted from the external magnetic field source from being formed toward the first shield portion.

The magnet may include at least two poles disposed in at least one of a displacement direction in which the position of the magnet is changed as the rotary arm rotates or a direction perpendicular to the displacement direction. The position of the magnet may be changed while maintaining a distance from the position detector in a direction along the rotational axis when the rotary arm rotates. In some embodiments, the magnet may be disposed to be spaced apart from the rotational axis at a distance in a radial direction with respect to the rotational axis. In some other embodiments, the magnet may be disposed such that its center is aligned with the rotational axis.

The aforementioned pedal apparatus for a vehicle of the present disclosure may provide one or more advantageous effects as follows. Since a magnetic force line forming a magnetic field of a magnet and a magnetic force line forming an external magnetic field are respectively formed along a plurality of shield portions disposed to be spaced apart from each other, mutual interference between the magnetic field of the magnet and the external magnetic field may be prevented or reduced.

Further, due to an air gap formed between the plurality of shield portions that respectively shield the magnetic field of the magnet and the external magnetic field, the necessary space for the pedal apparatus may be reduced as compared with the case that the plurality of shield portions are formed in a single body.

The effects according to the embodiment of the present disclosure are not limited to those mentioned above, and more various effects are included in the following description of the present disclosure.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
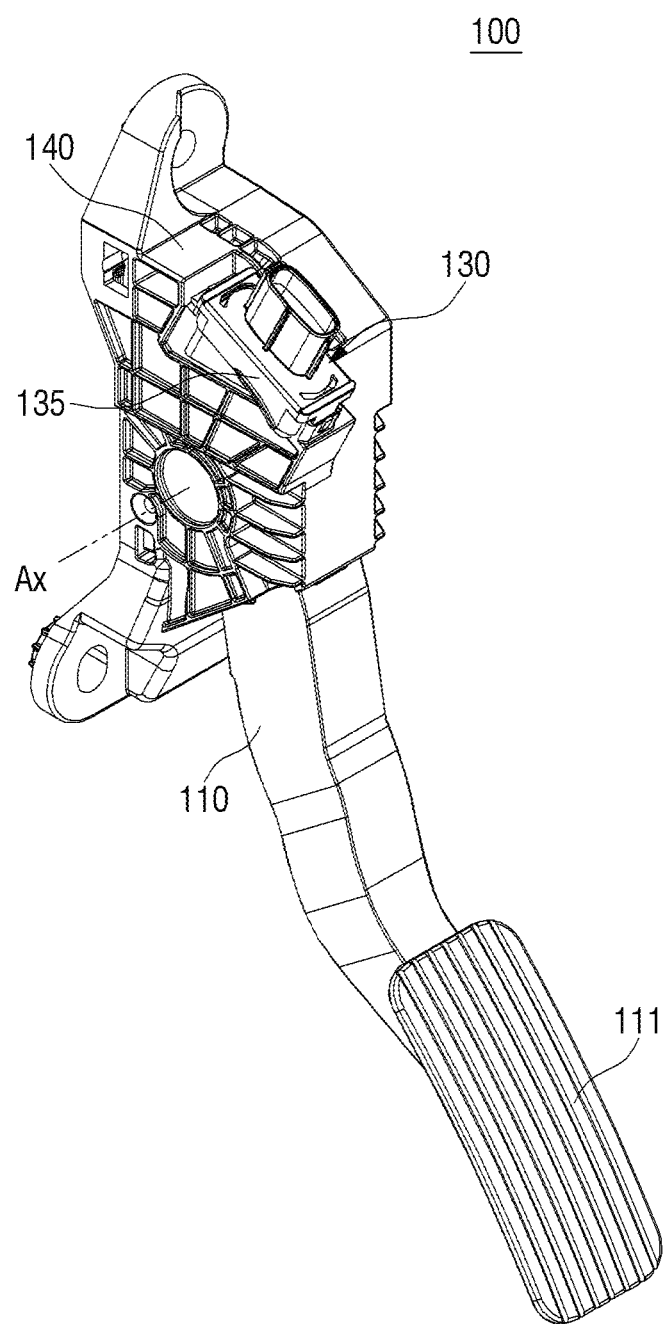
FIG. 1 is a perspective view illustrating a pedal apparatus for a vehicle according to an embodiment of the present disclosure.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, the embodiments of the present disclosure will be described with reference to the accompanying drawings illustrating a pedal apparatus for a vehicle.

Figure 2:
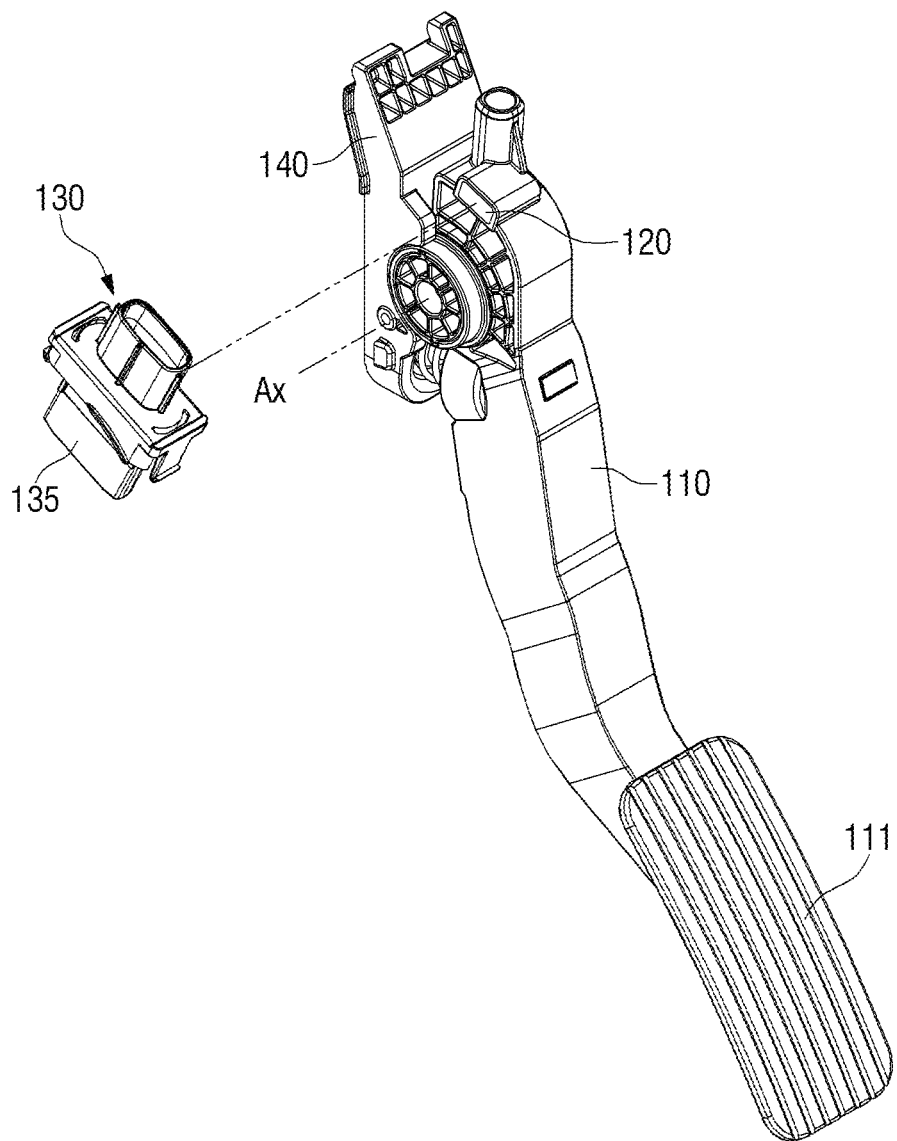
FIG. 2 is an exploded perspective view illustrating a pedal apparatus for a vehicle according to an embodiment of the present disclosure.
Figure 3:
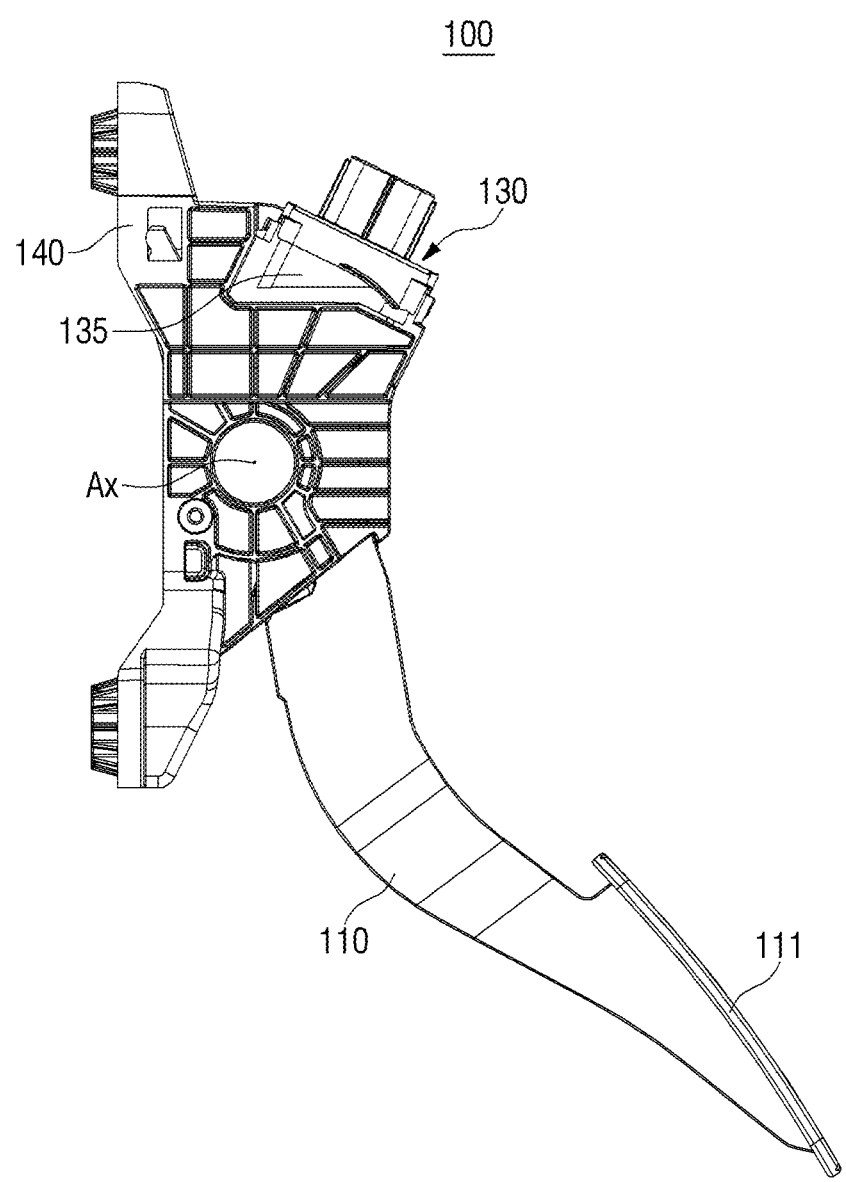
FIG. 3 is a side view illustrating a pedal apparatus for a vehicle according to an embodiment of the present disclosure.

FIG. 1 is a perspective view illustrating a pedal apparatus for a vehicle according to an embodiment of the present disclosure, FIG. 2 is an exploded perspective view illustrating a pedal apparatus for a vehicle according to an embodiment of the present disclosure, and FIG. 3 is a side view illustrating a pedal apparatus for a vehicle according to an embodiment of the present disclosure. FIG. 2 is an example that a portion of a pedal housing 140 of FIG. 1 is omitted for illustration purposes.

Referring to FIGS. 1 to 3, a pedal apparatus 100 for a vehicle according to an embodiment of the present disclosure may include a rotary arm 110, a magnet 120, and a position detector 130. The pedal apparatus 100 for a vehicle according to the present disclosure will be described for a pendant type that is installed by being hung on a dash panel, and the pedal apparatus will be described for an example where it is used for an acceleration of the vehicle. However, the present disclosure is not limited thereto, and the pedal apparatus 100 for a vehicle according to the present disclosure may be used for deceleration of the vehicle, and may similarly be applied to an organ type that is installed on a floor panel of the vehicle.

The rotary arm 111 may be provided with a pedal pad 111 at an end thereof to allow a driver to apply an operating force (e.g., a stepping force) for rotating the rotary arm 110 by stepping on the pedal pad 111 with a foot. The rotary arm 110 may be rotatably provided in the pedal housing 140 and thus be rotated with respect to a rotational axis Ax when the driver depresses or releases the pedal pad 111.

In the embodiment of the present disclosure, the pedal apparatus 100 for a vehicle implemented as a pendant type will be described by way of example. Therefore, the pedal pad 111 may be provided at a distal end of the rotary arm 110 close to the floor panel of the vehicle, and it may be understood that a proximal end of the rotary arm 110 is rotatably provided in the pedal housing 140, and thus the rotary arm 110 may be rotated with respect to the rotational axis Ax when the driver depresses or releases the pedal pad 111.

A position of the magnet 120 may be changed when the rotary arm 110 rotates. In the embodiment of the present disclosure, the magnet 120 may be positioned at the proximal end of the rotary arm 110 that is close to the rotational axis Ax, to be radially spaced apart from the rotational axis Ax at a predetermined distance from the rotational axis Ax, and its position may be changed (e.g., displaced) by being rotated with respect to the rotational axis Ax along with the rotary arm 110. However, the present disclosure is not limited thereto, and the magnet 120 may be disposed such that its center is aligned with the rotational axis Ax.

Two or more poles of the magnet 120 may alternately be arranged in at least one direction. The description that two or more poles are alternately arranged may mean that the total number of poles including N and S poles is equal to or greater than two and the N and S poles are alternately arranged. For example, it may be understood that alternately arranging two poles means arranging an N pole and an S pole in due order or vice versa, and alternately arranging three poles means arranging an N pole, an S pole, and an N pole in due order, or arranging an S pole, an N pole and an S pole in due order. Further, it may be understood that alternately arranging four poles means arranging an N pole, an S pole, an N pole, and an S pole in due order, or an S pole, an N pole, an S pole, and an N pole in due order.

Figure 4:
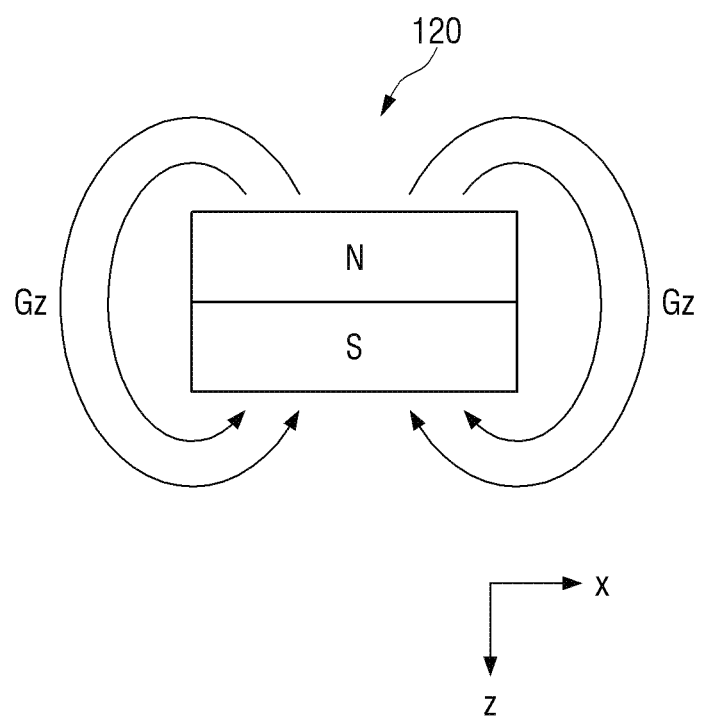
FIGS. 4 to 7 are schematic views illustrating a magnet according to an embodiment of the present disclosure.
Figure 5:
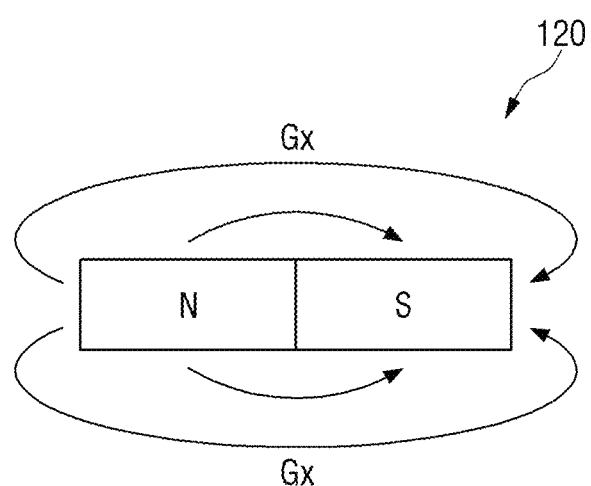
Figure 6:
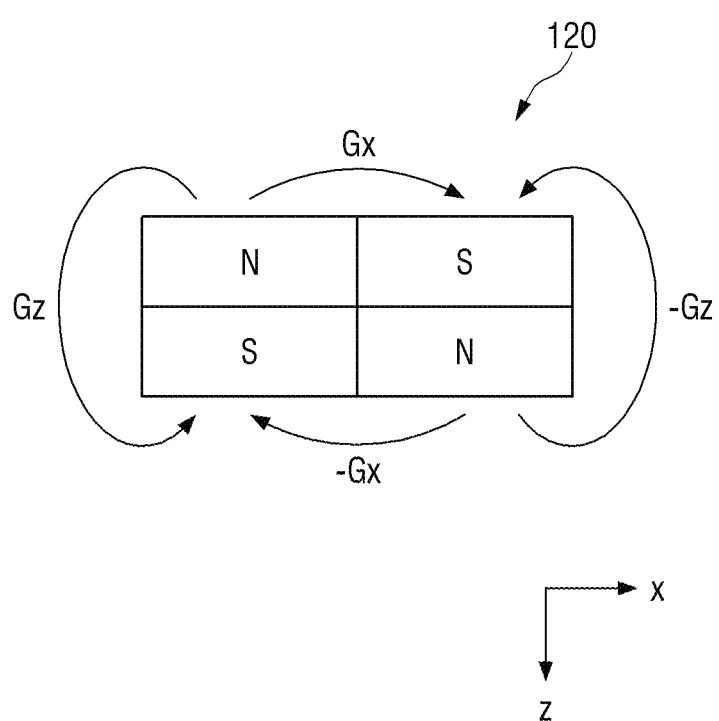
Figure 7:
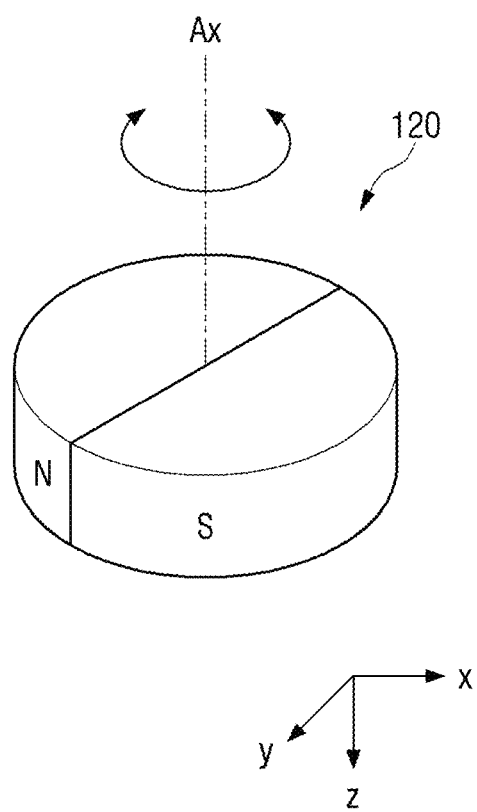

FIGS. 4 to 7 are schematic views illustrating a magnet according to an embodiment of the present disclosure. In FIGS. 4 to 6, a pole arrangement direction of the magnet 120 is shown for a configuration where an x-axis is a displacement direction in which the position of the magnet 120 is changed. In FIG. 7, the center of the magnet 120 is positioned to be aligned with the rotational axis Ax to illustrate an example where a z-axis is a rotational axis of an angular displacement.

More specifically, FIG. 4 is an example that a single N pole and a single S pole are alternately arranged in the z-axis direction perpendicular to the x-axis direction that is the displacement direction of the magnet 120 when the rotary arm 110 rotates, FIG. 5 is an example that a single N pole and a single S pole are alternately arranged in the x-axis direction that is the displacement direction of the magnet 120, and FIG. 6 is an example that two poles are respectively arranged in the x-axis direction, which is the displacement direction of the magnet 120, and the z-axis direction perpendicular to the x-axis direction.

As described above, magnetic force lines may be formed in different directions depending on the direction where the poles of the magnet 120 are arranged, such that the magnetic force lines may be emitted from the magnet 120 and then converged on the magnet 120.

For example, when the x-axis is the displacement direction of the magnet 120, a magnetic force line Gz may be formed along the z-axis direction in FIG. 4, and a magnetic force line Gx may be formed along the x-axis direction in FIG. 5. In FIG. 6, magnetic force lines Gx and −Gx may be formed along the x-axis direction and, at the same time, magnetic forces Gz and −Gz may be formed along the z-axis direction Herein, the magnetic force lines may have a positive sign and a negative sign to indicate their directionality, and it may be understood that when one of two-way directions has a positive sign, the other direction has a negative sign.

In FIGS. 4 to 6, the case that poles of the magnet 120 are arranged in at least one of the displacement direction of the magnet 120 or a direction perpendicular to the displacement direction is described by way of example. However, the present disclosure is not limited thereto, and it may be understood that the displacement direction of the magnet 120 may also be a rotational direction with respect to the rotational axis Ax as shown in FIG. 7 when the center of the magnet 120 is aligned with the rotational axis Ax of the rotary arm 110. In this case, two or more poles of the magnet 120 may be arranged in at least one of a direction parallel with the rotational axis Ax or a rotational direction about the rotational axis Ax, and the magnet 120 of FIG. 7 is an example that two poles are arranged in the rotational direction about the rotational axis Ax.

The position detector 130 may detect the strength of a magnetic field due to the magnet 120, the position of which is changed in accordance with the rotation of the rotary arm 110, as described above, and may output a detection signal based on the detected strength of the magnetic field. The detection signal that is output from the position detector 130 may be used by an electronic control unit (ECU) of the vehicle to determine the position of the rotary arm 110 and to control the amount of fuel-burn based on the determined position.

Figure 8:
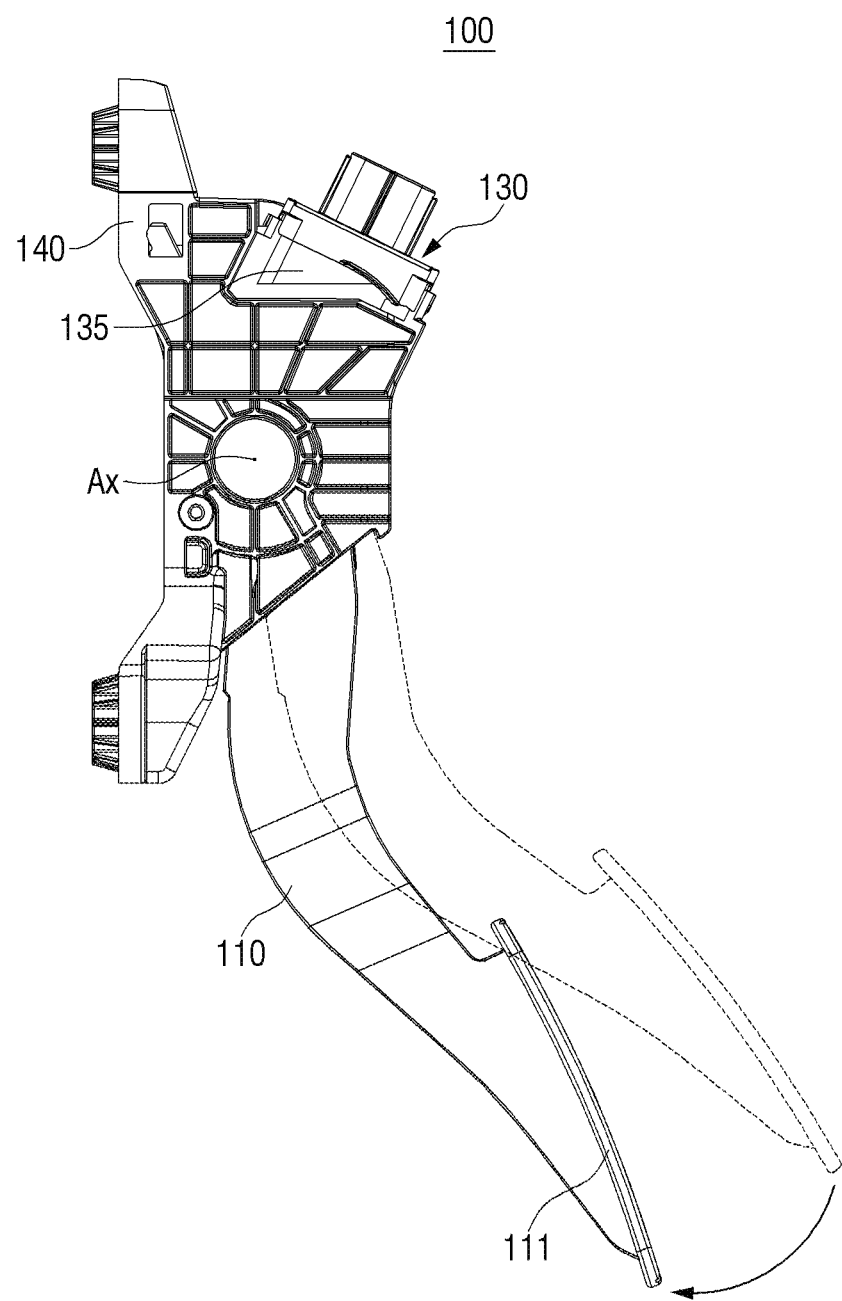
FIG. 8 is a schematic view illustrating a rotary arm rotated by an operating force applied to a pedal pad according to an embodiment of the present disclosure.
Figure 9:
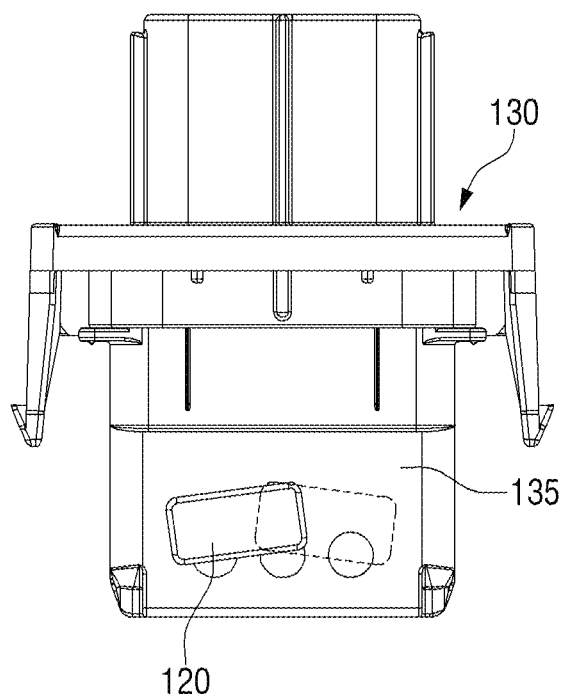
FIG. 9 is a schematic view illustrating a magnet, a position of which is changed when a rotary arm rotates in accordance with an embodiment of the present disclosure.

For example, when the driver steps on (e.g., depresses) the pedal pad 111, the rotary arm 110 may rotate as shown in FIG. 8. In this case, the position detector 130 may detect the strength of the magnetic field due to the magnet 120, the position of which is changed when the rotary arm 110 rotates as shown in FIG. 9, such that the position of the rotary arm 110 may be determined.

In the embodiment of the present disclosure, the case that the position detector 130 is disposed at one side of the magnet 120 in a direction parallel with the rotational axis Ax of the rotary arm 110, and the position of the magnet 120 is changed while maintaining a predetermined distance from the position sensor 130 as the rotary arm 110 rotates will be described by way of example. However, this example is to merely assist understanding of the present disclosure, and the present disclosure is not limited to such a configuration. The position of the magnet 120 may be changed in a direction of the rotational axis Ax, a direction perpendicular to the rotational axis Ax, or any combination thereof, and the distance between the magnet 120 and the position detector 130 may be maintained or changed depending on the direction in which the position of the magnet 120 is changed.

Figure 10:
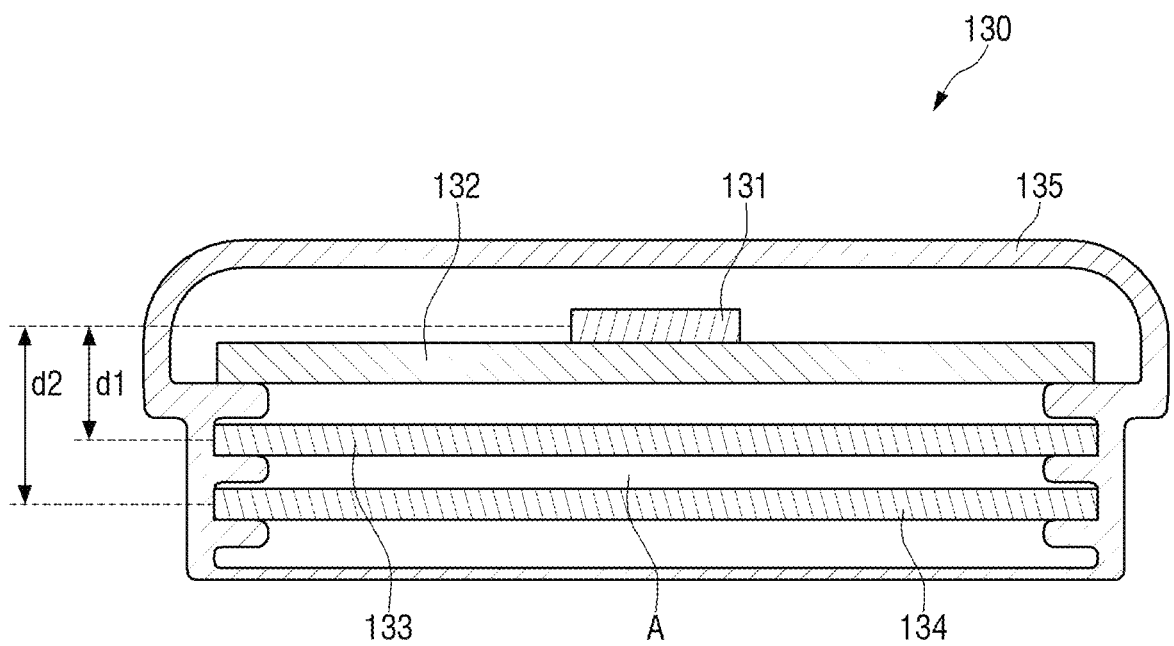
FIG. 10 is a sectional view illustrating a position detector according to an embodiment of the present disclosure.
Figure 11:
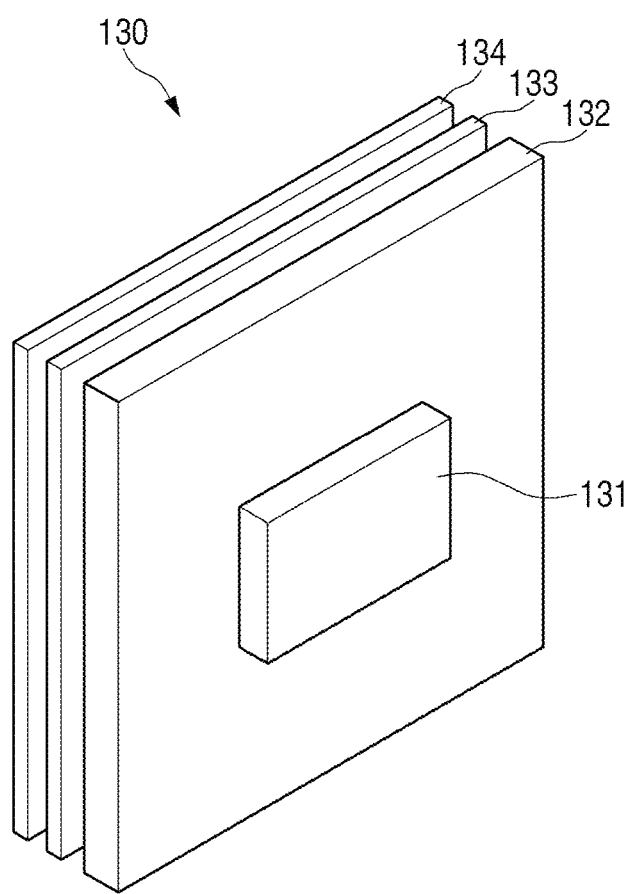
FIG. 11 is a perspective view illustrating a position detector according to an embodiment of the present disclosure.

FIG. 10 is a sectional view illustrating a position detector according to an embodiment of the present disclosure, and FIG. 11 is a perspective view illustrating a position detector according to an embodiment of the present disclosure. FIG. 11 is an example where a housing 135 of FIG. 10 is omitted for illustration purposes. Referring to FIGS. 10 and 11, the position detector 130 according to the embodiment of the present disclosure may include at least one sensor 131, a substrate 132 provided with the at least one sensor 131, and a plurality of shield portions 133 and 134. At least one sensor 131, the substrate 132, and the plurality of shield portions 133 and 134 may be accommodated in the housing 135 and thus may be disposed adjacent to the magnet 120 provided in the rotary arm 110.

At least one sensor 131 may include a sensor, such as a Hall sensor, which may sense the strength of the magnetic field, and may include a plurality of sensors to prevent or reduce a sensing error. For example, when at least one sensor 131 includes a plurality of sensors, the plurality of sensors may output sensing signals having their respective magnitudes different from one another depending on the position of the magnet 120, and the ECU of the vehicle may control the amount of fuel-burn based on a relatively larger sensing signal when a magnitude difference between the sensing signals output from the respective sensors is within a certain range, and otherwise, may control the amount of fuel-burn based on a relatively smaller sensing signal.

Figure 12:
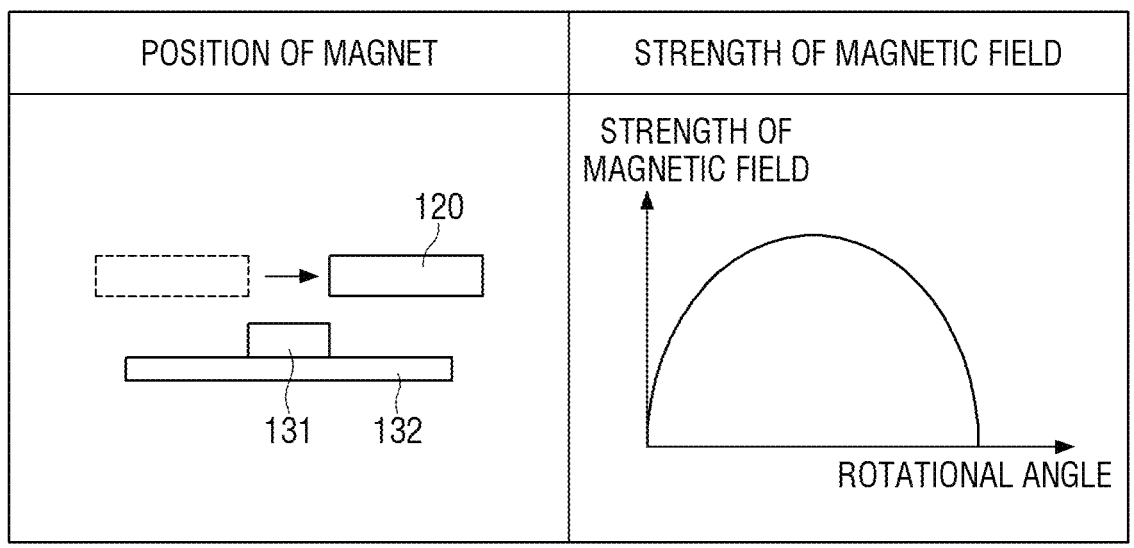
FIG. 12 is a schematic view illustrating the strength of a magnetic force detected by a position detector when a position of a magnet is changed in accordance with an embodiment of the present disclosure.

At least one sensor 131 may sense a rotational direction and a rotational angle of the rotary arm 110 based on the strength of the magnetic field that is changed depending on the position of the magnet 120 when the rotary arm 110 rotates as shown in FIG. 12. For example, when the position of the magnet 120 is changed in one direction from the time when the magnet 120 enters a sensing range of at least one sensor 131 to the time when the magnet 120 emerges out of the sensing range of at least one sensor 131, the strength of the magnetic field, which is sensed by at least one sensor 131, may be gradually increased until the magnet 120 reaches the center of the sensing range of at least one sensor 131 and then may be gradually decreased until the magnet 120 emerges out of the sensing range of at least one sensor 131. Accordingly, the rotational direction and the rotational angle of the rotary arm 110 may be determined based on the magnitude change of the magnetic field.

At least one sensor 131 described as above may be configured to sense a magnetic force line G1, which is emitted from the magnet 120 and then converged back on the magnet 120, when the pedal apparatus 100 of the present disclosure is not affected by an external magnetic field generated by an external magnetic field source. However, in practice, the magnetic field of the magnet 120 may be affected by an external magnetic field, which may degrade the accuracy of the position sensing. Herein, the external magnetic field source means an object, which may generate an external magnetic field having a level capable of generating mutual interference with the magnetic field generated by the magnet 120, such as a magnetic object disposed in the vehicle or an electric motor that serves a power source of an electric vehicle.

According to the embodiment of the present disclosure, the magnetic field of the magnet 120 and the external magnetic field may be shielded from each other via a plurality of shield portions 133 and 134 that are disposed to have different distances from the magnet 120 such that the strength of the magnetic field of the magnet 120, which is sensed by at least one sensor 131, may not be affected or minimally affected by the external magnetic field, to prevent or minimize the interference between the magnetic field of the magnet 120 and the external magnetic field.

In the embodiment of the present disclosure, the plurality of shield portions 133 and 134 may be arranged in an opposite direction of the magnet 120 with respect to the substrate 132 such that the mutual interference may be prevented between the magnetic field of the magnet 120 and the external magnetic field. However, the present disclosure is not limited to such a configuration, and an arrangement direction of the plurality of shield portions 133 and 134 may be varied depending on a direction in which the external magnetic field is generated.

The plurality of shield portions 133 and 134 may be made of a material having a high permeability to induce a magnetic force line that forms a magnetic field. Hereinafter, in the embodiment of the present disclosure, the plurality of shield portions 133 and 134 will be referred to as a first shield portion 133 disposed at a first distance d1 from the magnet 120 and a second shield portion 134 disposed at a second distance d2 from the magnet 120, which is greater than the first distance d1. In other words, the plurality of shield portions 133 and 134 may include the first shield portion 133 disposed at the first distance d1 from the magnet 120 and the second shield portion 134 disposed at the second distance d2 from the magnet 120, which is greater than the first distance d1.

The first shield portion 133 may shield (e.g., confine) the magnetic field formed by the magnet 120 so as not to affect the external magnetic field, and the second shield portion 134 may shield the external magnetic field so as not to affect the magnetic field formed by the magnet 120.

Figure 13:
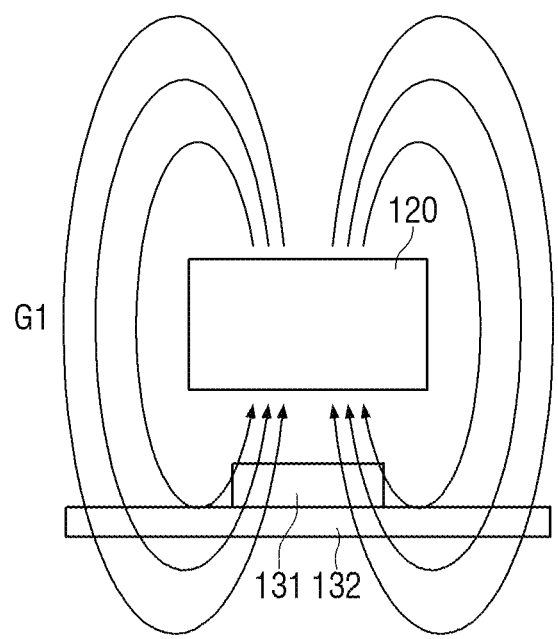
FIG. 13 is a schematic view illustrating a magnetic force line formed by a magnet in accordance with an embodiment of the present disclosure.
Figure 14:
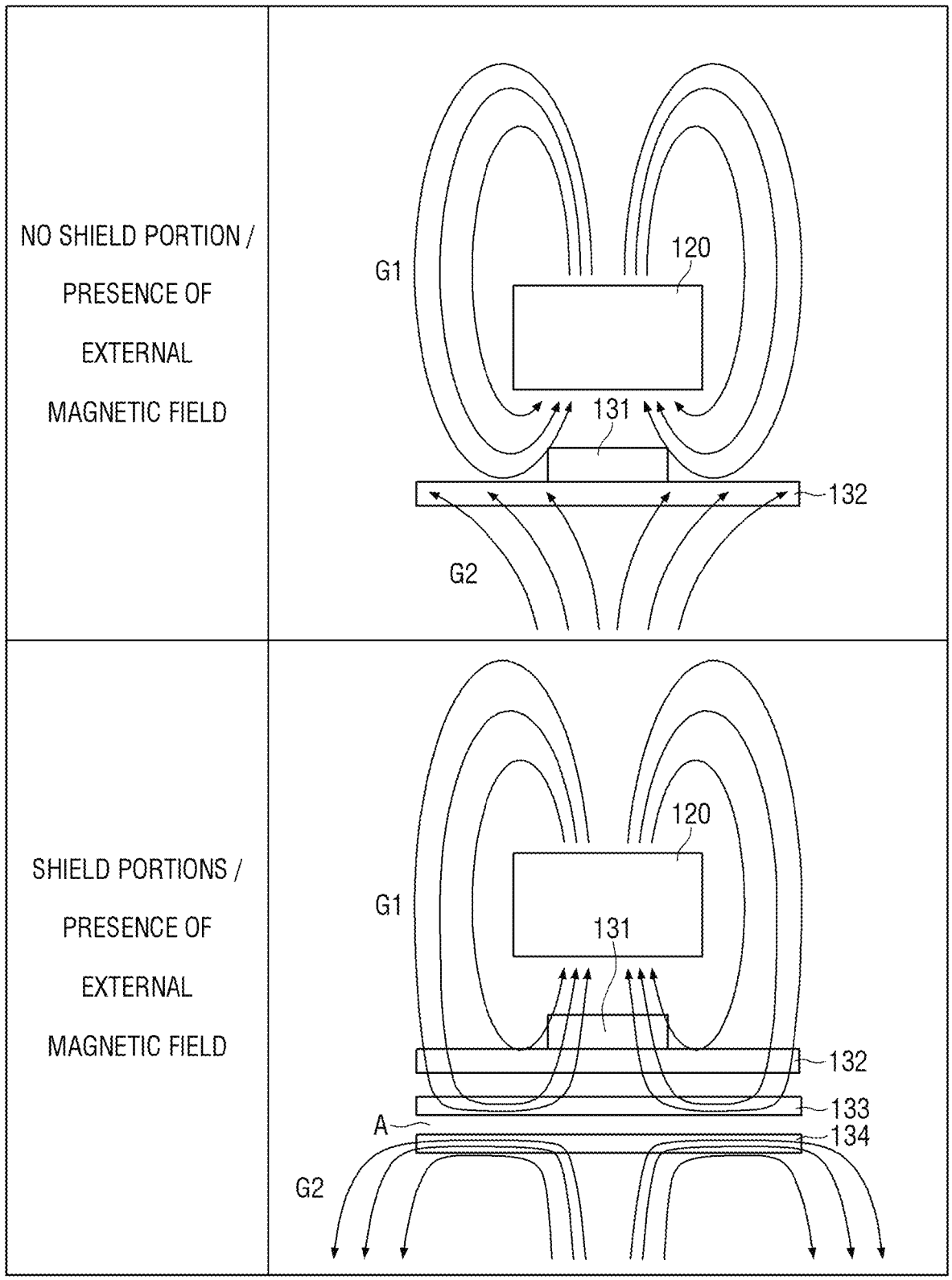
FIG. 14 is a schematic view illustrating magnetic force lines formed by a magnet and an external magnetic field source in accordance with an embodiment of the present disclosure.

FIG. 14 is a schematic view illustrating magnetic force lines formed by a magnet and an external magnetic field source in accordance with an embodiment of the present disclosure. Referring to FIG. 14, where the plurality of shield portions 133 and 134 are not present, it can be noted that the magnetic force line G1 emitted from the magnet 120 is affected by the magnetic force line G2 of the external magnetic field such that it is pushed toward the magnet 120, compared with FIG. 13. In this case, the external magnetic field as well as the magnetic field of the magnet 120 may be sensed by at least one sensor 131, whereby inaccurate or less accurate sensing may be made. Consequently, the position of the rotary arm 110 may be sensed with an error.

In the embodiment of the present disclosure, the first shield portion 133 and the second shield portion 134 may be respectively disposed to have different distances from the magnet 120, such that the position of the rotary arm 110 may be prevented from being sensed with an error potentially caused by the external magnetic field. In this case, a portion of the magnetic force line G1 emitted from the magnet 120 may be formed to be converged on the magnet 120 along the first shield portion 133. Similarly, a portion of the magnetic force line G2 emitted from the external magnetic field source may be formed to be converged on the external magnetic field source along the second shield portion 134. As a result, mutual interference between the magnetic field of the magnet 120 and the external magnetic field may be prevented or reduced.

In the embodiment of the present disclosure, the first shield portion 133 and the second shield portion 134 may be arranged to be spaced apart from each other at a predetermined distance such that an air gap A may be formed between them. This configuration may allow a necessary space to be reduced as compared with a case that the first shield portion 133 and the second shield portion 134 are formed in a single body.

In other words, when the first shield portion 133 and the second shield portion 134 are formed in a single body without an air gap A, a thickness required for preventing mutual interference between the magnetic field formed by the magnet 120 and the external magnetic field may be increased. However, in the embodiment of the present disclosure, since the first shield portion 133 and the second shield portion 134 are spaced apart from each other at a predetermined distance with an air gap A therebetween, a total thickness, which is a summation of a thickness of the first and second shield portions 133 and 134 and a thickness of the air gap A, may be relatively smaller.

A size of the air gap A formed between the first shield portion 133 and the second shield portion 134 may be varied depending on the thickness of the first shield portion 133 and the second shield portion 134. The thicker the first shield portion 133 and the second shield portion 134 are, the lower the likelihood may be for the magnetic force line to transmit the first shield portion 133 and the second shield portion 134. Therefore, the air gap A between the first shield portion 133 and the second shield portion 134 may be formed relatively small.

In the aforementioned embodiment, the case that both ends of each of the first shield portion 133 and the second shield portion 134 may be coupled to the housing 135 by sliding insertion, and the air gap A is formed between the first shield portion 133 and the second shield portion 134 has been described by way of example. However, the present disclosure is not limited thereto, and in accordance with the coupling method of the first shield portion 133 and the second shield portion 134, mutual interference may be prevented between the magnetic field of the magnet 120 and the external magnetic field even though the air gap A is not formed between the first shield portion 133 and the second shield portion 134, as described below.

Figure 15:
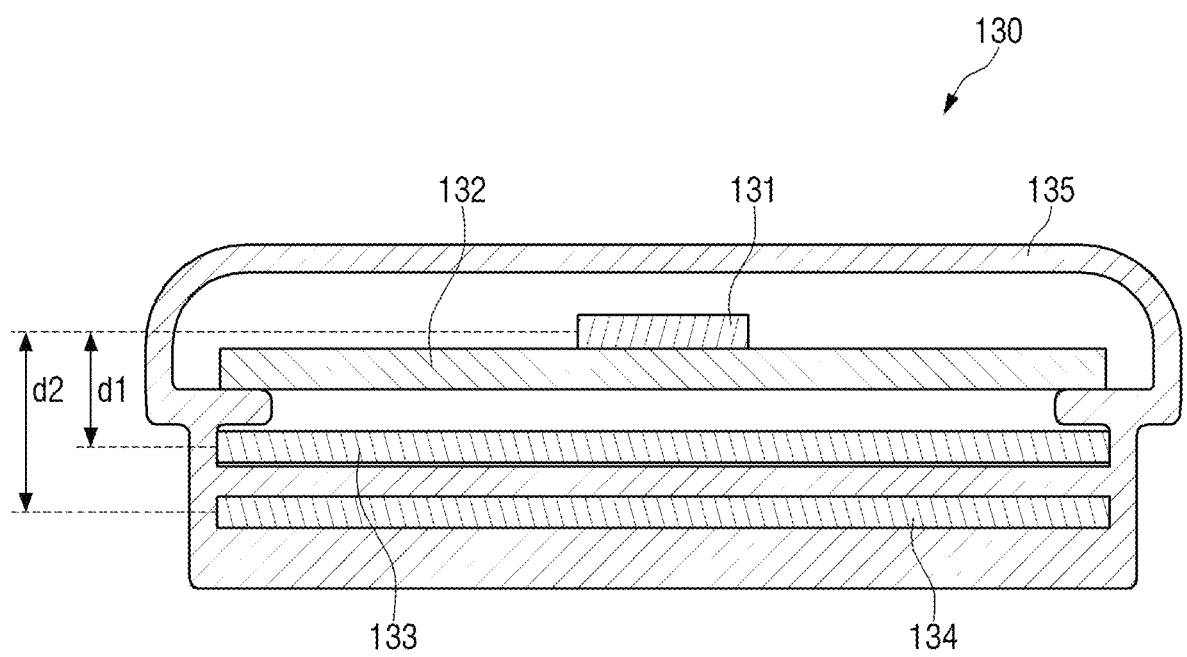
FIG. 15 is a sectional view illustrating a position detector according to another embodiment of the present disclosure.

FIG. 15 is a sectional view illustrating a position detector according to another embodiment of the present disclosure. Referring to FIG. 15, in the position detector 130 according to another embodiment of the present disclosure, both ends of the first shield portion 133 may be coupled to the housing 135 by sliding insertion, and the second shield portion 134 may be formed in a single body with the housing 135 via insert molding.

When the second shield portion 134 is insert-molded in the housing 135, the air gap A may not be necessary between the first shield portion 133 and the second shield portion 134. However, since the housing 135 is made of a material such as a non-conductive resin, even though the air gap A is not formed between the first shield portion 133 and the second shield portion 134, as shown in FIG. 14, a portion of the magnetic force line G1 emitted from the magnet 120 may be converged on the magnet 120 along the first shield portion 133, and a portion of the magnetic force line G2 emitted from the external magnetic field source may be converged on the external magnetic field source along the second shield portion 134, whereby mutual interference may be prevented between the magnetic field of the magnet 120 and the external magnetic field.

In FIG. 15, a case that a portion of the housing 135 made of a non-conductive material is disposed between the first shield portion 133 and the second shield portion 134 has been described by way of example. However, the present disclosure is not limited thereto, and a separate member made of a non-conductive material having a thickness corresponding to a spacing between the first shield portion 133 and the second shield portion 134 may be disposed between the first shield portion 133 and the second shield portion 134.

In the aforementioned embodiment, a case that the pedal apparatus 100 for a vehicle of the present disclosure is implemented as a pendant type has been described by way of example. However, the present disclosure is not limited thereto, and the aforementioned embodiment may be similarly applied to even the case that the pedal apparatus 100 for a vehicle of the present disclosure is an organ type.

Figure 16:
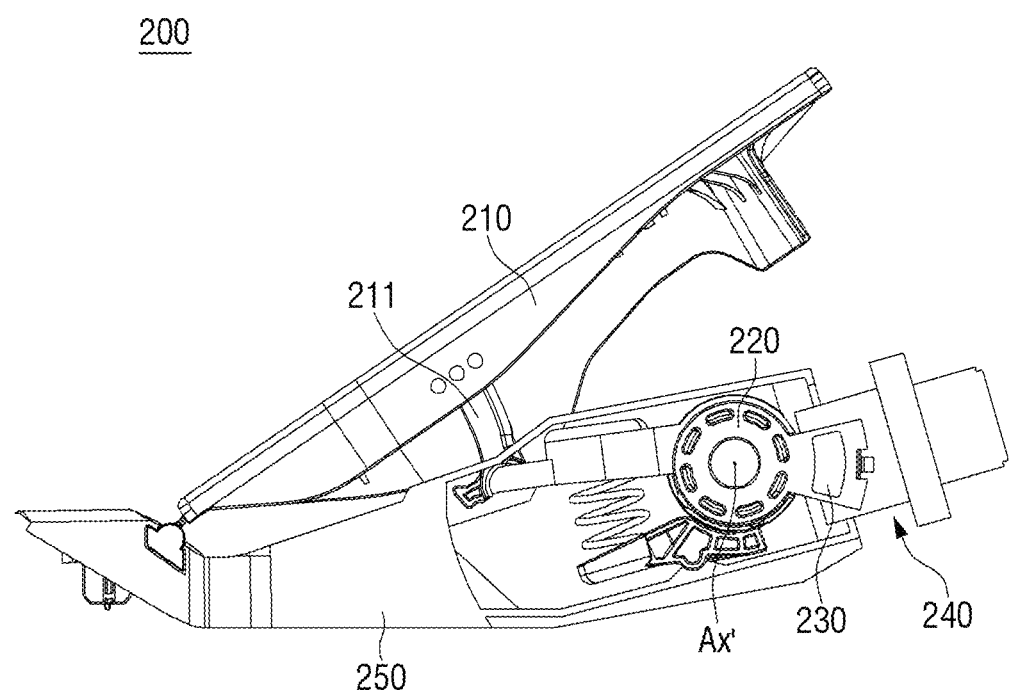
FIG. 16 is a side view illustrating a pedal apparatus for a vehicle according to another embodiment of the present disclosure.

FIG. 16 is a side view illustrating a pedal apparatus for a vehicle according to another embodiment of the present disclosure. Referring to FIG. 16, a pedal apparatus 200 for a vehicle according to another embodiment of the present disclosure may include a pedal pad 210, a rotary arm 220, a magnet 230, and a position detector 240.

The pedal apparatus 200 for a vehicle according to another embodiment of the present disclosure may be an organ type, and an operating force applied to the pedal pad 210 may be transferred to the rotary arm 220 disposed within a pedal housing 250 through a connection rod 211, and a position of a magnet 230 provided in the vicinity of a rotational axis Ax' of the rotary arm 220 may be changed in accordance with rotation of the rotary arm 220. Accordingly, the position detector 240 disposed adjacent to the magnet 230 may determine a rotational angle of the rotary arm 230 by detecting the strength of a magnetic force based on the position of the magnet 230.

In another embodiment of the present disclosure, the position detector 240 may perform the same or similar function as that of the position detector 130 of the aforementioned embodiment except for some difference in position, and thus its detailed description will be omitted.

As described above, even in case that the pedal apparatus 1 for a vehicle according to the present disclosure is an organ type, similarly to the aforementioned pendant type, a plurality of shield portions may be arranged to be spaced apart from one another at a predetermined distance to form an air gap such that mutual interference may be prevented between the magnetic field formed by the magnet 230 and the external magnetic field formed by the external magnetic field source. As a result, interference does not occur between the internal magnetic field formed by the magnet 230 and the external magnetic field formed by the external magnetic field source as described in FIG. 14.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A pedal apparatus for a vehicle, comprising:
   a rotary arm provided in a pedal housing and configured to be rotated with respect to a rotational axis by an operating force applied to a pedal pad connected at a distal end of the rotary arm;
   a magnet, wherein a position of the magnet is changed as the rotary arm rotates;
   a position detector configured for detecting a change of the position of the magnet as the rotary arm rotates,
   wherein the position detector includes:
      a sensor configured for sensing a strength of a magnetic field generated by the magnet; and
      a plurality of shield portions arranged to have different distances from the magnet to shield the magnetic field generated by the magnet from a magnetic field generated by an external magnetic field source.

2. The pedal apparatus for a vehicle of claim 1, wherein an air gap is formed between the plurality of shield portions.

3. The pedal apparatus for a vehicle of claim 2, wherein a width of the air gap is determined depending on a thickness of each of the plurality of shield portions.

4. The pedal apparatus for a vehicle of claim 3, wherein the greater the thickness of each of the plurality of shield portions is, the smaller the air gap is.

5. The pedal apparatus for a vehicle of claim 1, wherein adjacent shield portions among the plurality of shield portions are disposed to be spaced apart from one another at a predetermined distance, and
   wherein a member having a thickness corresponding to the predetermined distance and made of a non-conductive material is disposed between the adjacent shield portions.

6. The pedal apparatus for a vehicle of claim 1, wherein the plurality of shield portions are disposed in an opposite direction of the magnet with respect to the sensor.

7. The pedal apparatus for a vehicle of claim 1, wherein the plurality of shield portions include a first shield portion arranged at a first distance from the magnet, and a second shield portion arranged at a second distance from the magnet, the second distance being greater than the first distance.

8. The pedal apparatus for a vehicle of claim 7, wherein at least one of magnetic force lines emitted from the magnet is formed to be converged on the magnet via the first shield portion, and at least one of magnetic force lines emitted from the external magnetic field source is formed to be converged on the external magnetic field source via the second shield portion.

9. The pedal apparatus for a vehicle of claim 7, wherein the first shield portion prevents the magnetic force line emitted from the magnet from being formed toward the second shield portion, and the second shield portion prevents the magnetic force line emitted from the external magnetic field source from being formed toward the first shield portion.

10. The pedal apparatus for a vehicle of claim 1, wherein the magnet includes at least two poles disposed in at least one of a displacement direction in which the position of the magnet is changed as the rotary arm rotates or a direction perpendicular to the displacement direction.

11. The pedal apparatus for a vehicle of claim 1, wherein the position of the magnet is changed while maintaining a distance from the position detector in a direction along the rotational axis when the rotary arm rotates.

12. The pedal apparatus for a vehicle of claim 1, wherein the magnet is disposed to be spaced apart from the rotational axis at a distance in a radial direction with respect to the rotational axis.

13. The pedal apparatus for a vehicle of claim 1, wherein the magnet is disposed such that its center is aligned with the rotational axis.

* * * * *